(12) United States Patent
Luo

(10) Patent No.: US 8,714,784 B2
(45) Date of Patent: May 6, 2014

(54) LED LAMP INCLUDING LIGHT GUIDE AND METHOD OF REFLECTING LIGHT USING SAME

(75) Inventor: Hong Luo, Andover, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 877 days.

(21) Appl. No.: 12/708,353

(22) Filed: Feb. 18, 2010

(65) Prior Publication Data

US 2010/0208488 A1    Aug. 19, 2010

Related U.S. Application Data

(60) Provisional application No. 61/153,530, filed on Feb. 18, 2009.

(51) Int. Cl.
*F21V 7/10* (2006.01)
*F21V 7/00* (2006.01)

(52) U.S. Cl.
USPC .  362/311.12; 362/555; 362/341; 362/311.11; 362/311.13; 362/269.1

(58) Field of Classification Search
USPC .......................................... 362/311.12, 296.1
See application file for complete search history.

(56) References Cited

U.S. PATENT DOCUMENTS

| | | |
|---|---|---|
| 4,349,705 A | 9/1982 | Kuhfus |
| 5,542,017 A | 7/1996 | Koike |
| 5,727,108 A | 3/1998 | Hed |
| 5,931,570 A | 8/1999 | Yamuro |
| 6,095,655 A | 8/2000 | Bigliati et al. |
| 6,272,269 B1 | 8/2001 | Naum |
| 6,350,041 B1 | 2/2002 | Tarsa et al. |
| 6,388,393 B1 | 5/2002 | Illingworth |
| 6,488,392 B1 | 12/2002 | Lu |
| 6,543,911 B1 | 4/2003 | Rizkin et al. |
| 6,565,239 B2 | 5/2003 | Rizkin et al. |

(Continued)

FOREIGN PATENT DOCUMENTS

| | | |
|---|---|---|
| DE | 199 24 316 A1 | 11/2000 |
| DE | 10 2005 018336 A1 | 8/2006 |
| EP | 1 528 603 A2 | 5/2005 |
| WO | 2006/089503 A1 | 8/2006 |

OTHER PUBLICATIONS

Emmanuel Berthomme, International Search Report for PCT/US10/24613, Mar. 30, 2010, pp. 1-4, European Patent Office, Rijswijk, The Netherlands.

*Primary Examiner* — Nimeshkumar Patel
*Assistant Examiner* — Jacob R Stern
(74) *Attorney, Agent, or Firm* — Shaun P. Montana

(57) ABSTRACT

An LED lamp including a light guide/light pipe, and a method of reflecting light using same, are disclosed. The LED lamp includes a transparent light pipe enclosed in an envelope, where the light pipe has a lower section and an upper section. The lamp also includes an LED in a recess at a lower end of the lower section, and a reflector formed by an indentation in an upper end of the upper section. The lower section may be a compound parabolic concentrator, and the upper section may be a tapered cylinder. The lower section of the light pipe collects light emitted from the LED, the upper section of the light pipe directs the collected light onto the reflector, and the reflector reflects the directed light in a radial direction.

16 Claims, 3 Drawing Sheets

(56) References Cited

U.S. PATENT DOCUMENTS

| | | | |
|---|---|---|---|
| 6,577,073 | B2 | 6/2003 | Shimizu et al. |
| 6,814,470 | B2 | 11/2004 | Rizkin et al. |
| 6,899,443 | B2 | 5/2005 | Rizkin et al. |
| 6,902,291 | B2 | 6/2005 | Rizkin et al. |
| 6,932,496 | B2 | 8/2005 | Rizkin et al. |
| 6,951,418 | B2 | 10/2005 | Rizkin et al. |
| 6,963,688 | B2 | 11/2005 | Nath |
| 6,981,786 | B2 | 1/2006 | Yao et al. |
| 6,988,815 | B1 | 1/2006 | Rizkin et al. |
| 7,021,797 | B2 * | 4/2006 | Miñano et al. ............... 362/355 |
| 7,066,637 | B2 | 6/2006 | Nozawa et al. |
| 7,092,612 | B1 | 8/2006 | Coushaine |
| 7,110,656 | B2 | 9/2006 | Coushaine et al. |
| 7,111,972 | B2 | 9/2006 | Coushaine et al. |
| 7,213,940 | B1 | 5/2007 | Van De Ven et al. |
| 7,217,022 | B2 | 5/2007 | Ruffin |
| 7,229,201 | B2 | 6/2007 | Krupa et al. |
| 7,237,927 | B2 | 7/2007 | Coushaine et al. |
| 7,329,029 | B2 | 2/2008 | Chaves et al. |
| 7,386,203 | B2 | 6/2008 | Maitland et al. |
| 7,503,669 | B2 | 3/2009 | Rizkin et al. |
| D599,491 | S * | 9/2009 | Luo ................................. D26/4 |
| 7,744,246 | B2 | 6/2010 | Rizkin et al. |
| 7,897,985 | B2 | 3/2011 | Galvez |
| 2002/0136027 | A1* | 9/2002 | Hansler et al. ................ 362/559 |
| 2003/0185005 | A1 | 10/2003 | Sommers et al. |
| 2004/0218858 | A1 | 11/2004 | Guy |
| 2005/0036324 | A1 | 2/2005 | Sherer |
| 2005/0151141 | A1 | 7/2005 | Grotsch et al. |
| 2005/0225988 | A1 | 10/2005 | Chaves et al. |
| 2006/0104068 | A1 | 5/2006 | Yao et al. |
| 2006/0146544 | A1 | 7/2006 | Leung |
| 2007/0047232 | A1 | 3/2007 | Kim et al. |
| 2007/0053203 | A1 | 3/2007 | Graham |
| 2007/0188876 | A1 | 8/2007 | Hines et al. |
| 2007/0223216 | A1 | 9/2007 | Jensen et al. |
| 2007/0225777 | A1 | 9/2007 | Heacock et al. |
| 2008/0128730 | A1 | 6/2008 | Fellows et al. |
| 2008/0151534 | A1 | 6/2008 | Lin |
| 2008/0192480 | A1 | 8/2008 | Rizkin et al. |
| 2008/0198595 | A1 | 8/2008 | Lai |
| 2009/0129230 | A1 | 5/2009 | Grotsch |
| 2010/0214196 | A1 | 8/2010 | Browaeys |

* cited by examiner

LED LAMP INCLUDING LIGHT GUIDE AND METHOD OF REFLECTING LIGHT USING SAME

CROSS-REFERENCE TO RELATED APPLICATION

This application claims priority to U.S. Provisional Application Ser. No. 61/153,530, entitled "LED LAMP" and filed on Feb. 18, 2009, the entirety of which is hereby incorporated by reference herein.

TECHNICAL FIELD

The present invention relates to lighting, and more specifically, to lighting devices incorporating solid-state lighting technology.

BACKGROUND

Solid-state lighting technology, including light emitting diodes (LEDs), has long been seen as a way of producing lamps having greater energy efficiency than conventional incandescent lamps, and less negative environmental impacts than conventional compact fluorescent lamps. Numerous so-called retrofit lamps, using solid-state lighting technology, have been introduced. From a consumer's viewpoint, however, a significant drawback for these conventional retrofit lamps is that they do not look like a conventional incandescent lamp. This is especially true for retrofits meant to replace conventional B10 candelabra-style incandescent lamps. LEDs and/or other solid state lighting components generate a large amount of heat that must be dissipated through use of a thermal management system (e.g., a heat sink). Typically, this thermal management system is realized by mounting the LED/LEDs on a metallic, opaque pedestal that protrudes into the bulb. The pedestal transfers heat away from the LEDs, but results in a conventional B10 retrofit lamp looking very different from a conventional B10 incandescent lamp.

SUMMARY

Embodiments of the present invention overcome the various issues discussed above with regards to conventional B10 retrofit lamps. That is, embodiments as described herein provide an optical design that creates an emission pattern that gives a sparking appearance, similar to that of a conventional incandescent B10 lamp. One or more light-emitting diodes (LEDs) is/are concealed in the base of a lamp having, for example, an envelope that is shaped light a conventional incandescent B10 lamp. The light emitted by the LED/LEDs is guided by total internal reflection through a light pipe to a reflector that directs the light into a desired emission pattern. The light pipe is comprised of a transparent material such as acrylic plastic. Thus, to the observer, the reflected light from the reflector appears to be emitted from a point suspended within the envelope of the lamp, much like a conventional B10 incandescent bulb.

In an embodiment, there is provided an LED lamp. The LED lamp includes a transparent light pipe enclosed in an envelope, wherein the light pipe has a lower section and an upper section. The LED lamp also includes an LED in a recess at a lower end of the lower section of the light pipe, and a reflector formed by an indentation in an upper end of the upper section of the light pipe. The lower section of the light pipe collects light emitted from the LED, the upper section of the light pipe directs the collected light onto the reflector, and the reflector reflects the directed light in a radial direction.

In a related embodiment, the reflector may have a surface of revolution defined by a multi-part curve, wherein a first part of the multi-part curve may have a radius of a first length, a second part of the multi-part curve may have a radius of a second length, and the first length and the second length may be different. In a further related embodiment, the first part of the multi-part curve, in relation to the second part of the multi-part curve, may have a greater component in a vertical direction to reflect more light in an up direction. In another further related embodiment, the second part of the multi-part curve, in relation to the first part of the multi-part curve, may have a greater component in a horizontal direction to reflect more light in a down direction. In yet another further related embodiment, the surface of revolution may be formed by a Bézier curve.

In another related embodiment, the reflector may be formed by metallization of an outer surface of the indentation or by filling the indentation with a white material or by ultrasonic welding of an injection molded white part to the indentation. In still another related embodiment, the lower section of the light pipe may be a compound parabolic concentrator (CPC), wherein the compound parabolic concentrator may collimate the light emitted from the LED. In a further related embodiment, the upper section of the light pipe may be a tapered cylinder that narrows towards the upper end of the light pipe, wherein the tapered cylinder may direct the collimated light from the compound parabolic concentrator to the reflector. In a further related embodiment, the tapered cylinder may be defined in part by a taper angle, wherein an increase in the taper angle may result in a more intense reflection of light by the reflector, and wherein a decrease in the taper angle may result in a less intense reflection of light by the reflector. In another further related embodiment, the tapered cylinder may be defined in part by a cylinder length, and wherein an increase in the cylinder length may result in an increase of light emitted through a side of the tapered cylinder.

In still another related embodiment, the envelope may be in the shape of a conventional B10 incandescent bulb. In a further related embodiment, the light pipe, the LED, and the reflector may be sized such that the light pipe is able to fit within the conventional B10 incandescent bulb-shaped envelope.

In another embodiment, there is provided a light guide for an LED lamp. The light guide includes a compound parabolic concentrator having a lower end and an upper end, wherein the lower end is located nearest to an LED; a tapered cylinder having a wide end and a narrow end, wherein the wide end is coupled to the upper end of the compound parabolic concentrator; and a reflector, wherein the reflector is formed by an indentation at the narrow end of the tapered cylinder. The compound parabolic concentrator and the tapered cylinder use total internal reflection to guide light emitted from the LED to the reflector, and the reflector reflects the guided light in a radial direction.

In a related embodiment, the compound parabolic concentrator may receive light emitted from the LED and collimate it, and the tapered cylinder may direct the collimated light from the compound parabolic concentrator towards the reflector. In another related embodiment, the compound parabolic concentrator and the tapered cylinder may be transparent, and light may be emitted from an outer edge of both the compound parabolic concentrator and the tapered cylinder. In still another related embodiment, the reflector may have a surface of revolution defined by a multi-part curve, wherein a first part of the multi-part curve may have a radius of a first length, a second part of the multi-part curve may have a radius of a second length, and the first length and the second length may be different. In yet still another related embodiment, the compound parabolic concentrator, the tapered cylinder, and the reflector may all be sized so as to be able to fit within a conventional B10 incandescent bulb-shaped envelope.

In yet another embodiment, there is provided a method of reflecting light emitted by an LED in a radial direction. The method includes receiving light emitted from an LED; transmitting the received light to a reflector via total internal reflection through use of a compound parabolic concentrator coupled to a tapered cylinder; and reflecting the transmitted light in a radial direction with the reflector.

In a related embodiment, transmitting may include collimating the received light within the compound parabolic concentrator, and directing the collimated light within the tapered cylinder to the reflector. In another related embodiment, reflecting may include reflecting, via a reflector defined by an indentation at a narrow end of the tapered cylinder, the transmitted light in a radial direction.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
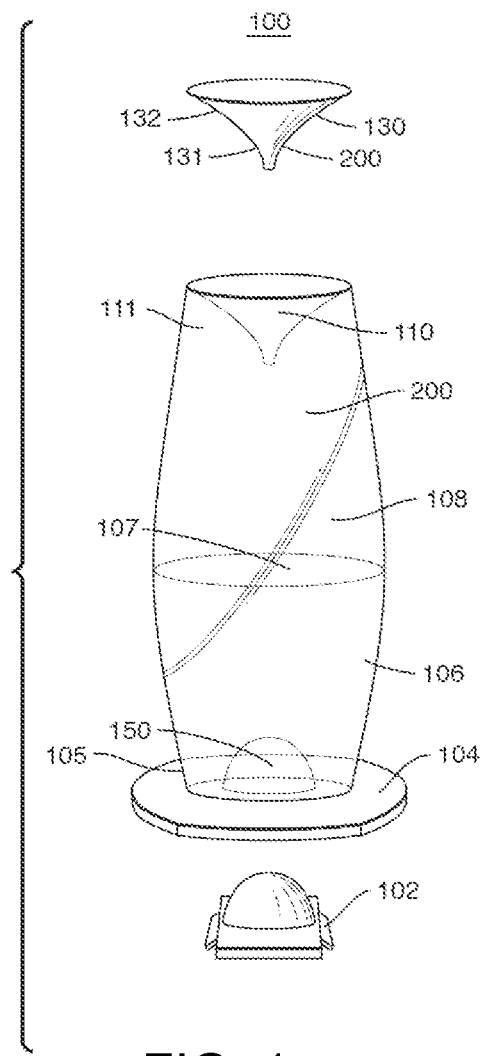
FIG. 1 shows a component view of an LED lamp including a light guide according to embodiments disclosed herein.

FIG. 1 shows component view of an LED lamp 100, according to embodiments disclosed herein. The LED lamp 100 includes an LED 102 and a light guide 200. The light guide 200 is formed from a light pipe 107 having a lower section 106 and an upper section 108, and a reflector 112. In some embodiments, the LED 102 is a single light-emitting diode, fixed on a chip or other substrate material, while in other embodiments, the LED 102 is comprised of a plurality of light-emitting diodes. As used throughout, the phrase "light-emitting diode" or "LED" may include any type of solid-state light emitter, such as but not limited to conventional LEDs, organic LEDs (OLEDs), and the like. The light pipe 107, in some embodiments, has a base 104. The LED 102 sits within a recess 150 at a lower end 105 of the lower section 106 of the light pipe 107. The recess is preferably hemispherical, to reduce reflective losses, but may be of any suitable shape for containing an LED. In some embodiments, the LED 102 within the recess 150 is concealed in the base 104 of the light pipe 107. The base 104 may be flanged to provide for stability and ease of mounting. In some embodiments, a heat sink or other thermal management system or device (not shown) forms part of the base 104 of the LED lamp 100 to direct heat away from the LED 102. The heat sink or other thermal management system may be fixed or otherwise coupled to the LED lamp 100, but this is not required.

The reflector 112 is formed by an indentation 110 in an upper end 111 of the upper section 108 of the light pipe 107. The lower section 106 of the light pipe 107 collects light emitted from the LED 102. The upper section 108 of the light pipe 107 directs that collected light onto the reflector 112. The reflector 112 then reflects that directed light in a radial direction. The reflector 112 is sufficiently small that it creates a sparkling appearance similar to the filament in an incandescent bulb.

The reflector 112 may take a variety of shapes depending on the curvature of the surface of the indentation 110, which may also be referred to herein as a surface of revolution 113. That is, the curvature of the surface of the indentation 110 (i.e., the surface of revolution 113) determines the curvature of the reflector 112. Varying the curvature of the reflector 112 in this way results in the creation of different emission patterns suitable for different applications. For example, in some applications, it may be more desirable to have more forward emission, while it may be more desirable in a wall sconce application to have more side emission to illuminate the wall and ceiling for a wall-washing effect. Alternatively, in a high-mounted chandelier, it may be more desirable to have more light directed downward toward the observer whose eyes are well below the level of the chandelier. Thus, for example, in some embodiments, the surface of revolution 113 is conical in shape, resulting in a conical-shaped reflector. In other embodiments, the surface of revolution 113 may result in the reflector 112 having a curved-shape. In some embodiments, this curve shape may be a Bézier curve. The surface of revolution 113, in some embodiments, is defined by a multi-part curve 130. The multi-part curve 130 has at least two parts. In some embodiments, a first part 131 of the multi-part curve 130 has a radius of a first length, while a second part 132 of the multi-part curve 130 has a radius of a second length. These lengths may be of any size that results in the creation of a multi-part curve, such as the multi-part curve 130 shown in FIG. 1, and in some embodiments, these lengths are different.

Figure 2:
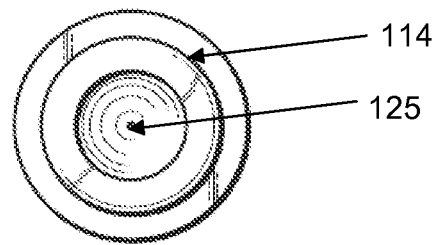
FIG. 2 shows a top view of the LED lamp including a light guide according to embodiments disclosed herein.

Varying the length of one or both parts of the multi-part curve 130 (by varying the surface of indentation 113) will result in changes to the emission pattern of the LED lamp 100. Each part of the multi-part curve 130 may be thought to have both a horizontal component and a vertical component, where the horizontal component is in a horizontal direction in relation to a center 125 (shown in FIG. 2) of the LED lamp 100 and the vertical component is in a vertical direction in relation to the center 125 of the LED lamp 100. For example, increasing a vertical component of the first part 131 of the multi-part curve 130 will result in more light being reflected in a direction that is up, and axially out, in relation to the LED lamp 100. Similarly, increasing a horizontal component of the second part 132 of the multi-part curve 130 will result in more light being reflected in a direction that is down, and axially out, in relation to the LED lamp 100.

The reflector 112 may be formed in any known way. For example, the reflector 112 may be an injection molded part that is ultrasonic welded to the indentation 110 in the light pipe 107. Alternatively, the indentation 110 may be filed with a white-colored material to form the reflector 112. Alternatively, an outer surface of the indentation 110 may be coated with a reflective material, such as but not limited to silver, resulting in the metallization of the outer surface of the indentation 110.

As stated above, the light pipe 107 has a lower section 106 and an upper section 108. The lower section 106, in some embodiments, is a compound parabolic concentrator (CPC). The compound parabolic concentrator collimates the light emitted from the LED. That is, the angle of emission of light at the LED 102 is different from the angle of emission at the top of the compound parabolic concentrator (i.e., where the compound parabolic concentrator meets the upper section 108 of the light pipe 107). As its name implies, the shape of the outer edge of a vertical cross section of the compound parabolic concentrator is parabolic, that is, shaped like a parabola. The width of the compound parabolic concentrator thus depends on the rate of rise of each side of the parabola.

The upper section 108 of the light pipe 107 is, in some embodiments, a tapered cylinder. The tapered cylinder directs the collimated light from the lower section 106/compound parabolic concentrator to the reflector 112. The tapered cylinder narrows from the lower section 106/compound parabolic concentrator towards the upper end 111 of the light pipe 107. This tapering causes the collimated light to be directed to the reflector 112. The tapered cylinder is, in some embodiments, defined in part by a taper angle. The taper angle is the angle between an outer edge of a vertical cross section of the tapered cylinder and a vertical line drawn from the point at which the tapered cylinder and the compound parabolic concentrator meet. An increase in the taper angle results in a more intense reflection of light by the reflector 112, and a decrease in the taper angle results in a less intense reflection of light by the reflector 112. That is, the more tapered (i.e., narrow) the upper end of the tapered cylinder is, the more intense the reflection of light by the reflector 112. In some embodiments, the tapered cylinder is, additionally or alternatively, defined in part by cylinder length. The cylinder length is the measurement of the height of the tapered cylinder, from the point at which the tapered cylinder and the compound parabolic concentrator meet to the uppermost edge of the tapered cylinder where it meets the reflector 112. An increase in the length of the tapered cylinder results in an increase of light emitted through a side of the tapered cylinder.

Figure 4:
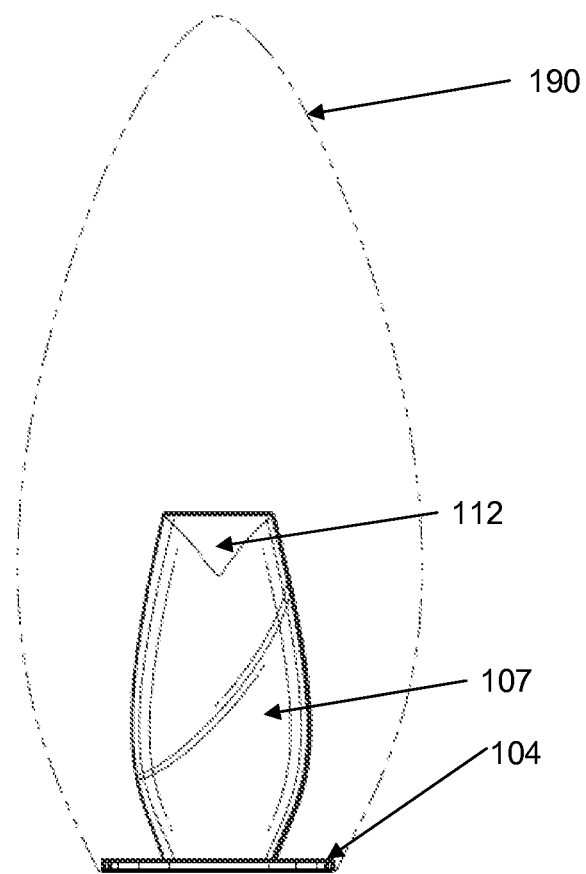
FIG. 4 shows a side view of an LED lamp including a light guide and an envelope according to embodiments disclosed herein.

In some embodiments, the light pipe 107 is enclosed in an envelope 190, such as is shown in FIG. 4. The light pipe 107 is, in some embodiments, transparent. Alternatively, or additionally, in some embodiments, the light pipe 107 may be, in whole or in part, semi-transparent or translucent. Further, in some embodiments, the entirety or part of the light pipe 107 may be surrounded by a transparent, semi-transparent, translucent, or opaque material, or combinations thereof. The light pipe 107 may be made of a dialectic material, such as but not limited to acrylic. The envelope 190 may be of any shape, and in some embodiments, the envelope 190 is in the shape of a conventional B10 incandescent bulb (e.g., a candelabra shape). The envelope 190, in some embodiments, also encompasses the LED 102 (not shown in FIG. 4), the base 104, and the reflector 112. In such embodiments, the light pipe 107, the LED 102, and the reflector 112 are all sized such that they are able to fit within the envelope 190.

Figure 3:
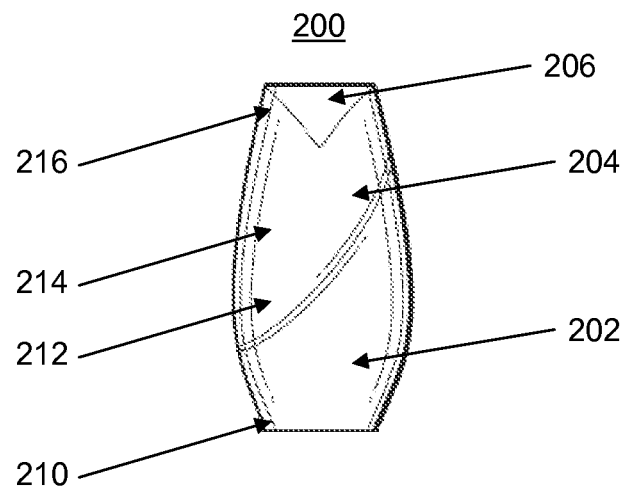
FIG. 3 shows a side view of a light guide according to embodiments disclosed herein.

The light guide 200 is shown in more detail in FIG. 3. The light guide 200 includes a compound parabolic concentrator 202 (equivalent to the lower section 106 of the light pipe 107 shown in FIG. 1, and possessing all of the properties described above with regards to FIG. 1), a tapered cylinder 204 (equivalent to the upper section 108 of the light pipe 107 shown in FIG. 1, and possessing all of the properties described above with regards to FIG. 1), and reflector 206 (equivalent to the reflector 112 shown in FIG. 1, and possessing all of the properties described above with regards to FIG. 1). The compound parabolic concentrator 202 has a lower end 210 and an upper end 212. The lower end 210 is located nearest to an LED (not shown in FIG. 3). The tapered cylinder 204 has a wide end 214 and a narrow end 216. The wide end 214 is coupled to the upper end 212 of the compound parabolic concentrator 202. The reflector 206 is formed by an indentation at the narrow end 216 of the tapered cylinder 204. The combination of the compound parabolic concentrator 202 and the tapered cylinder 204 use total internal reflection to guide light emitted from the LED to the reflector 206. The reflector 206 then reflects the guided light in a radial direction. More specifically, the compound parabolic concentrator 202 receives light emitted from the LED and collimates it, and the tapered cylinder 204 directs the collimated light from the compound parabolic concentrator 202 towards the reflector 206.

As with the light pipe 107 shown in FIG. 1 and described above, in some embodiments, the compound parabolic concentrator 202 and the tapered cylinder 204 are transparent. Thus, in such embodiments, light is emitted from an outer edge 114 (shown in FIG. 2) of both the compound parabolic concentrator 202 and the tapered cylinder 204 (i.e., the light pipe 107). Alternatively, in some embodiments, light is emitted from an outer edge 114 (shown in FIG. 2) of only the tapered cylinder 204, or from an outer edge 114 (shown in FIG. 2) of only the compound parabolic concentrator 204. Note that, in some embodiments, the compound parabolic concentrator 202 and the tapered cylinder 204 may each be: transparent; semi-transparent; translucent; surrounding by a material that is transparent, semi-transparent, translucent, or opaque, or a combination of these; or a combination of any of these. Further, in some embodiments, the light guide 200 is encompassed within an envelope, such as but not limited to a conventional B10 incandescent bulb-shaped envelope. In such embodiments, the compound parabolic concentrator 202, the tapered cylinder 204, and the reflector 206 are all sized so as to be able to fit within the envelope.

Figure 5:
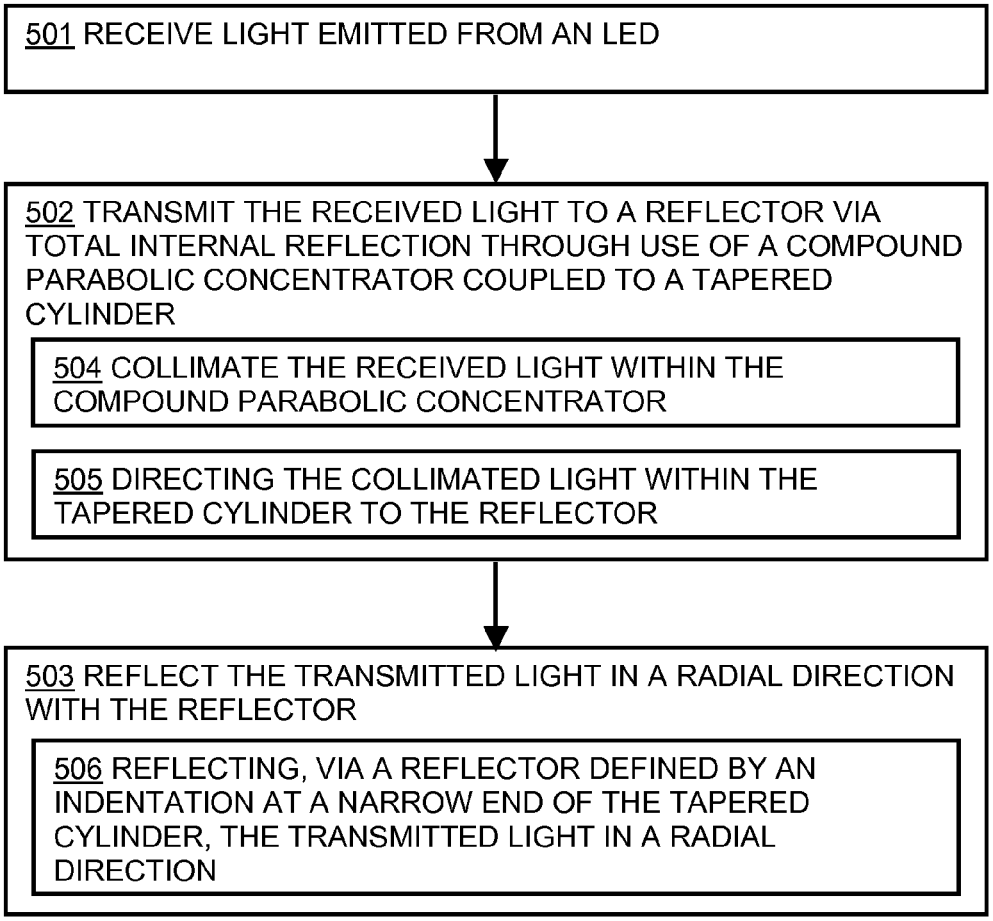
FIG. 5 illustrates a flowchart of a method performed by a light guide according to embodiments disclosed herein.

FIG. 5 shows a flowchart of a method performed by the LED lamp 100 shown in FIG. 1 and/or the light guide 200 shown in FIG. 3. The method results in light emitted by an LED, such as the LED 102 shown in FIG. 1, being reflected in a radial direction. First, light emitted from an LED, such as the LED 102 shown in FIG. 1, is received, step 501. The received light is then transmitted to a reflector (e.g., element 112 shown in FIG. 1) via total internal reflection through use of a compound parabolic concentrator (e.g., element 106 shown in FIG. 1) coupled to a tapered cylinder (e.g., element 108 shown in FIG. 1), step 502. Finally, the transmitted light is reflected in a radial direction by with the reflector, step 503. In some embodiments, transmitting may include collimating the received light within the compound parabolic concentrator, step 504, and directing the collimated light within the tapered cylinder to the reflector, step 505. Additionally, or alternatively, in some embodiments, reflecting may include reflecting, via a reflector defined by an indentation at a narrow end of the tapered cylinder, the transmitted light in a radial direction, step 506.

In some embodiments, a reflector may not be necessary and is thus not included. In such embodiments, the indentation 110 at the end of the upper section 108 of the light pipe 107/tapered cylinder 204 has: a smooth surface, in which case light emitted by the LED 102 is transmitted via total internal reflection; or a rough surface, in which case light emitted by the LED 102 is scattered at the indentation 110; or a combination thereof (for example, a first portion of the indentation has a smooth surface while the remaining portion of the indentation may has a rough surface).

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. An LED lamp comprising:
   a transparent light pipe enclosed in an envelope, wherein the light pipe has a lower section and an upper section;
   an LED in a recess at a lower end of the lower section of the light pipe; and
   a reflector formed by an indentation in an upper end of the upper section of the light pipe;
   wherein the lower section of the light pipe collects light emitted from the LED, the upper section of the light pipe directs the collected light onto the reflector, and the reflector reflects the directed light in a radial direction, and wherein the lower section of the light pipe is a compound parabolic concentrator, wherein the compound parabolic concentrator collimates the light emitted from the LED, and wherein the upper section of the light pipe is a tapered cylinder that narrows towards the upper end of the light pipe, wherein the tapered cylinder directs the collimated light from the compound parabolic concentrator to the reflector.

2. The LED lamp of claim 1 wherein the reflector has a surface of revolution defined by a multi-part curve, wherein a first part of the multi-part curve has a radius of a first length, wherein a second part of the multi-part curve has a radius of a second length, and wherein the first length and the second length are different.

3. The LED lamp of claim 2 wherein the first part of the multi-part curve, in relation to the second part of the multi-part curve, has a greater component in a vertical direction to reflect more light in an up direction.

4. The LED lamp of claim 2 wherein the second part of the multi-part curve, in relation to the first part of the multi-part curve, has a greater component in a horizontal direction to reflect more light in a down direction.

5. The LED lamp of claim 2 wherein the surface of revolution is formed by a Bézier curve.

6. The LED lamp of claim 1 wherein the reflector is formed by metallization of an outer surface of the indentation or by filling the indentation with a white material or by ultrasonic welding of an injection molded white part to the indentation.

7. The LED lamp of claim 1 wherein the tapered cylinder is defined in part by a taper angle, wherein an increase in the taper angle results in a more intense reflection of light by the reflector, and wherein a decrease in the taper angle results in a less intense reflection of light by the reflector.

8. The LED lamp of claim 1 wherein the tapered cylinder is defined in part by a cylinder length, and wherein an increase in the cylinder length results in an increase of light emitted through a side of the tapered cylinder.

9. The LED lamp of claim 1 wherein the envelope is in the shape of a conventional B10 incandescent bulb.

10. The LED lamp of claim 9 wherein the light pipe, the LED, and the reflector are sized such that the light pipe is able to fit within the conventional B10 incandescent bulb-shaped envelope.

11. A light guide for an LED lamp comprising:
    a compound parabolic concentrator having a lower end and an upper end, wherein the lower end is located nearest to an LED;
    a tapered cylinder having a wide end and a narrow end, wherein the wide end is coupled to the upper end of the compound parabolic concentrator; and
    a reflector, wherein the reflector is formed by an indentation at the narrow end of the tapered cylinder;
    wherein the compound parabolic concentrator and the tapered cylinder use total internal reflection to guide light emitted from the LED to the reflector, and wherein the reflector reflects the guided light in a radial direction.

12. The light guide of claim 11, wherein the compound parabolic concentrator receives light emitted from the LED and collimates it, and wherein the tapered cylinder directs the collimated light from the compound parabolic concentrator towards the reflector.

13. The light guide of claim 11 wherein the compound parabolic concentrator and the tapered cylinder are transparent, and wherein light is emitted from an outer edge of both the compound parabolic concentrator and the tapered cylinder.

14. The light guide of claim 11, wherein the reflector has a surface of revolution defined by a multi-part curve, wherein a first part of the multi-part curve has a radius of a first length, wherein a second part of the multi-part curve has a radius of a second length, and wherein the first length and the second length are different.

15. The light guide of claim 11, wherein the compound parabolic concentrator, the tapered cylinder, and the reflector are all sized so as to be able to fit within a conventional B10 incandescent bulb-shaped envelope.

16. A method of reflecting light emitted by an LED in a radial direction, the method comprising:
    receiving light emitted from an LED;
    transmitting the received light to a reflector via total internal reflection through use of a compound parabolic concentrator coupled to a tapered cylinder by collimating the received light within the compound parabolic concentrator and directing the collimated light within the tapered cylinder to the reflector; and
    reflecting the transmitted light in a radial direction with the reflector, by reflecting, via a reflector defined by an indentation at a narrow end of the tapered cylinder, the transmitted light in a radial direction.

* * * * *